US012549543B2

(12) United States Patent
Gault

(10) Patent No.: US 12,549,543 B2
(45) Date of Patent: Feb. 10, 2026

(54) EFFECTING COOPERATION AMONG EXECUTABLE ROUTINES TO IMPLEMENT REGULAR AUTOMATED CREDENTIAL ROTATION

(71) Applicant: JPMorgan Chase Bank, N.A., New York, NY (US)

(72) Inventor: Martin Gault, Glasgow (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 246 days.

(21) Appl. No.: 18/239,933

(22) Filed: Aug. 30, 2023

(65) Prior Publication Data

US 2025/0080528 A1 Mar. 6, 2025

(51) Int. Cl.
*H04L 9/40* (2022.01)
(52) U.S. Cl.
CPC ...... *H04L 63/0846* (2013.01); *H04L 63/0435* (2013.01)
(58) Field of Classification Search
CPC ............. H04L 63/0846; H04L 63/0435; H04L 63/0428
See application file for complete search history.

(56) References Cited

U.S. PATENT DOCUMENTS

| 10,523,434 | B1* | 12/2019 | Sharifi Mehr | ........ H04L 9/0891 |
| 2009/0320108 | A1* | 12/2009 | Livingston | ............ H04L 9/0891 726/6 |
| 2016/0321461 | A1* | 11/2016 | Oliver | ................. G06F 21/6209 |
| 2022/0094530 | A1* | 3/2022 | Sreeravindra | ......... H04L 9/0897 |
| 2022/0393868 | A1* | 12/2022 | Mozano | ............. G06F 21/6218 |

* cited by examiner

*Primary Examiner* — Henry Tsang
(74) *Attorney, Agent, or Firm* — Greenblum & Bernstein, P.L.C.

(57) ABSTRACT

In one example, a method for rotating security credentials includes instantiating an execution environment in which to execute instructions of a script. The method also includes executing the instructions of the script within the execution environment to cause the at least one processor to monitor a passage of time to identify an arrival of a time to coordinate a rotation of a security credential between an executable routine and a secrets management service. The at least one processor is also caused, in response to identifying the arrival of the time, perform operations including: providing a first request to the executable routine to communicate with the secrets management service of the processing device to request rotation of the security credential at the secrets management service, and providing a second request to the executable routine to rotate the security credential at the executable routine.

20 Claims, 9 Drawing Sheets

EFFECTING COOPERATION AMONG EXECUTABLE ROUTINES TO IMPLEMENT REGULAR AUTOMATED CREDENTIAL ROTATION

BACKGROUND

It has long been a standard practice to use security credentials (e.g., passwords, encryption keys, etc.) to secure such large-scale processing systems as servers, as well as the sensitive application routines executed therein and/or the sensitive data sets stored therein. More specifically, in large scale processing systems such as those maintained by larger governmental, business, educational and/or medical entities, different ones of the computing devices thereof are frequently in communication with each other, and such security credentials are employed to establish such communications, and/or to control access by one such computing device to sensitive application routines and/or sensitive data within another such computing device. It has long been an accepted practice to allow such security credentials to remain unchanged for relatively extended periods of time. However, more recently, it has become a best practice for such security credentials to be automatically rotated on a relatively frequent basis, thereby necessitating changes to be made to many application routines and many lower-level system routines.

BRIEF DESCRIPTION OF THE DRAWINGS

The drawings illustrate only particular examples of the disclosure and therefore are not to be considered limiting of their scope. The principles here are described and explained with additional specificity and detail through the use of the accompanying drawings.

DETAILED DESCRIPTION

Figure 1:
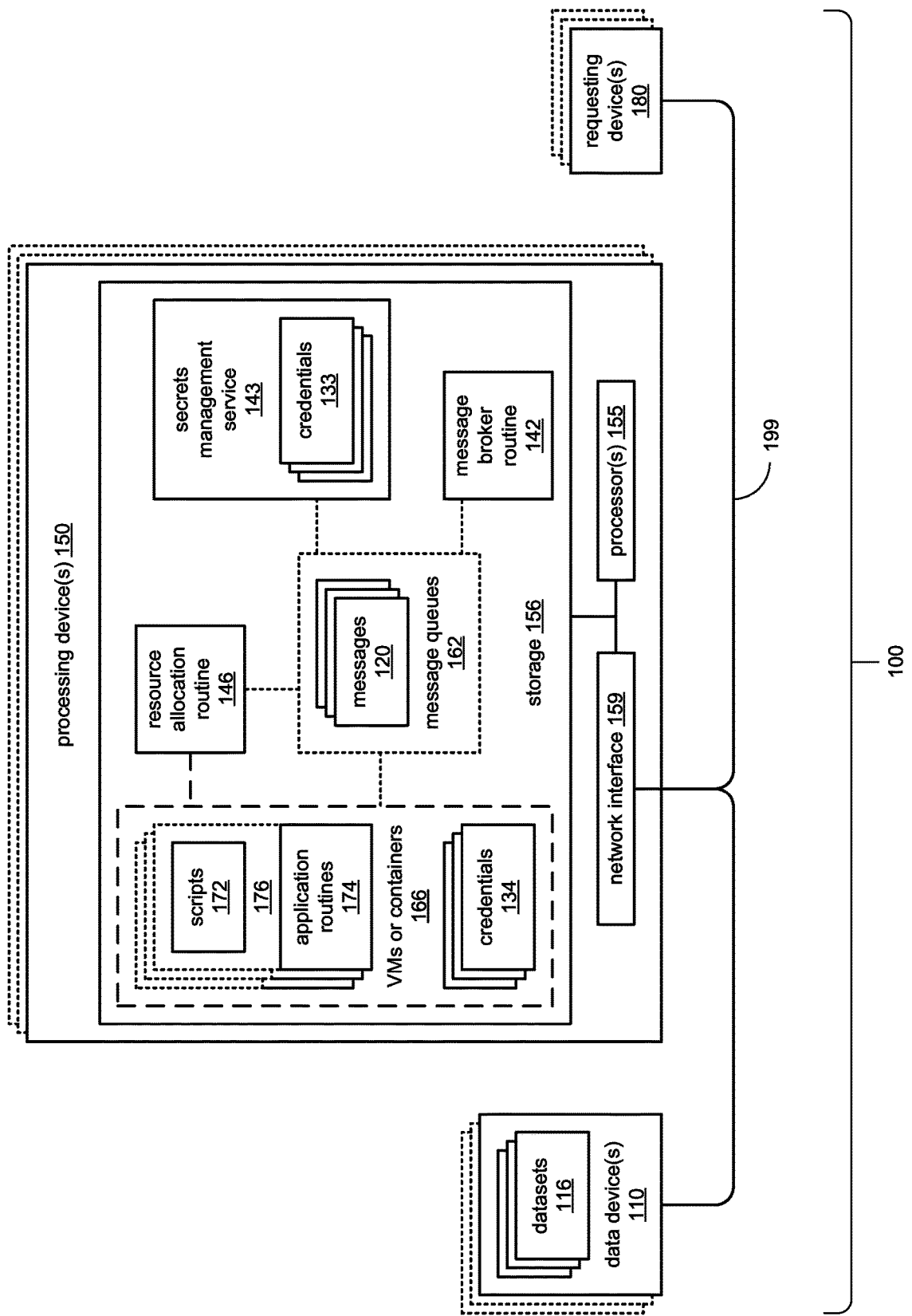
FIG. 1 illustrates a system supporting regular automated credential rotation according to examples of the present disclosure.

In a server or other similar processing device, a subset of the application routines executed therein and/or a subset of the datasets stored therein may be secured with security credentials that are automatically rotated on a relatively frequent basis. This may be the result of the successful completion of changes made to such application routines and/or to other software routines to implement such rotation of credentials.

However, the adoption of such regular automated rotation of security credentials as a best practice for application routines and/or datasets is a relatively recent development. As a result, it is not uncommon for current day servers and/or other similar processing devices to continue to execute application routines and/or to continue to store datasets that are secured using at least some security credentials that are "static" inasmuch as they may be changed relatively infrequently (e.g., changed manually during repairs and/or upgrades to processing devices), or not at all.

The addition of such a feature as the regular automated rotation of security credentials may require the expenditure of a considerable amount of time and/or other resources to make modifications to existing software routines and/or to create entirely new software routines. The changes to add such a feature to an existing software routine often include changes to its internal architecture to add secure pathways between software components that had not been deemed likely to ever need to interact. It is not uncommon for the creation of an entirely new software routine (or a portion thereof) to prove to be less burdensome than modifying an existing software routine. As a result, the speed of adoption of the requirement to implement this new best practice has far exceeded the speed with which it has actually been implemented.

To at least temporarily accommodate the use of an application routine for which at least a subset of security credentials is not regularly automatically rotated, a script or other set of executable instructions may be provided that is able to be executed within the secure execution environment of that application routine to cause such a regular automated rotation of that subset of security credentials. The fact that such a script is executed within the secure execution environment of the application routine may enable use of the same security privileges as are granted to the application routine. Such a script may include independent control of when such relatively frequent rotations of credentials occur. Also, such a script may include the performance of various checks of the current condition of the application routine, of the credential to be replaced by such rotation, of the new credential, etc. Further, such a script may interact with the application routine in a manner that mimics the entering of commands by an operator of a terminal device.

In this manner, such an application routine is able to continue to be used until it is able to be replaced by a newer version of the same application routine that fully implements regular automated rotation of security credentials, or by an entirely different application routine that does so.

FIG. 1 presents a block diagram of a system 100 in which at least one script 172 may be executed within an execution environment 176 provided of an application routine 174 to cause the regular automated rotation of at least one security credential according to examples of the present disclosure. In so doing, an inability of the application routine 174 to, itself, cause such regular automated rotation of the at least one security credential may be remedied, and the security of the application routine may be improved.

In the example of FIG. 1, the system 100 may include at least one processing device 150, at least one data device 110, and/or at least one requesting device 180 that are coupled via a network 199.

The at least one data device 110 may serve as a repository of multiple datasets 116 that are accessible to the at least one processing device 150 via the network 199. The data within each data set 116 may cover any of a variety of subjects, including and not limited to, various fields of sciences (e.g., particle physics, geology, meteorology, etc.), various fields of engineering (e.g., aircraft design, automotive design, semiconductor device design, etc.), various societal fields of study (e.g., economic, behavior of individuals during emergencies, etc.), and/or various fields of study of wildlife (e.g., animal migration patterns, animal populations, etc.). Data values within each dataset 116 may be any of a variety of types of data (e.g., text, audio/video, numeric values, etc.). Alternatively, or additionally, data values within each data set 116 may be deterministic and/or probabilistic (e.g., expressed as probability distributions).

Each processing device 150 of the at least one processing device 150 may include at least one processor 155, a storage 156, and/or a network interface 159 that couples the processing device 150 to the network 199. As depicted, the storage 156 may store a resource allocation routine 146, a secrets management service 143 and/or a message broker routine 142. As also depicted, the resource allocation routine 146 may allocate portions of the storage space within the storage 156 for virtual machines (VMs) or containers 166 to provide a separate execution environment for each application routine 174 and/or each instance of an application routine 174. As further depicted, the message broker routine 142 may allocate portions of the storage space within the storage 156 for various message queues 162 enabling exchanges of messages 120.

It may be that multiple ones of the VMs or containers 166 are instantiated within each processing device 150 of the at least one processing device 150 to enable the at least partially parallel execution of multiple different application routines 174, and/or multiple instances of a single application routine 174. The provision of multiple ones of the VMs or containers 166 may enable the processing, storage and/or other resources of a single processing device 150 to be allocated among multiple application routines 174, and/or multiple instances 174 of a single application routine 174, in a controlled manner that enables each to be executed within a functional equivalent of a separate processing device.

Such separate execution environments may serve to provide a degree of isolation and/or security that prevents a malfunctioning or compromised application routine 174 (or instance of an application routine 174) executed within one VM or container 166 from impairing the execution of another application routine 174 (or another instance of the same application routine 174) within another VM or container 166. Alternatively, or additionally, and as depicted, each VM or container 166 may enable the isolated storage of separate security credential(s) 134 and/or scripts 172 for different application routines 174, and/or the storage of different instances of security credential(s) 134 and/or scripts 172 for different instances of the same application routine 174.

For each VM or container 166, a separate secure inter-process communication (IPC) path may be instantiated to enable secure communications with the secrets management service 143 and/or other services that may be provided within each processing device to the VMs or containers 166 that are instantiated therein. In, and as will be discussed in greater detail, it may be that such a secure IPC path is instantiated along with a VM or container 166 to enable the secure provision of security credential(s) 133 to the application routine 174 (or instance of an application routine 174) that is executed therein.

In some implementations, each such secure IPC path may be another of the message queues 162 in which communications and the exchange of security credential(s) 133 are carried out through an exchange of messages 120. In other implementations, each such secure IPC path may be a separate shared memory space allocated to each VM or container 166, and to which access is shared with the secrets management service 143. In still other implementations, each such secure IPC path may be a separate pair of uni-directional pipes instantiated between the secrets management service 143 and each VM or container 166.

Where there are multiple ones of the VMs or containers 166 instantiated within each processing device 150 to support the execution of multiple instances of the same application routine 174, at least one additional message queue 162 may also be instantiated to enable the exchange of messages 120 thereamong. Such messages 120 may enable coordination of shared access to dataset(s) 116 thereamong. Alternatively, or additionally, and as will be discussed in greater detail, it may be that messages 120 coordinating aspects of security thereamong are so exchanged.

Regardless of what message queues 162 are instantiated and/or between what routines, and as will be explained in greater detail, it may be that routines and/or scripts (e.g., the scripts 172 that may accompany an application routine 174 within a VM or container 166) are able to incorporate executable instructions that enable the monitoring a message queue 162 for the output of a particular message 120. In this way, such an application routine 174 and/or such scripts 172 may await and use a particular message 120 as a trigger to commence execution and/or to perform operations.

As will be explained in greater detail, it may be that at least a subset of the application routines 174 provide an execution environment 176 within which instructions of associated scripts 172 may be executed. This may enable such scripts 172 to be securely executed under the direct control of such application routines 174 in an execution environment that is nested within the execution environment of a corresponding VM or container 166.

Where there are multiple ones of the processing device 150, the multiple processing devices 150 may, together, form a grid, cluster, or other set of processing devices 150 among which the executions of multiple application routines 174, and/or multiple instances of at least one application routine 174, may be distributed. At least where the executions of multiple instances of a single application routine 174 are so distributed, at least a subset of coordinating messages 120 may be exchanged thereamong through the network 199.

The application routine 174 executed within each VM or container 166 may perform any of a variety of functions, including and not limited to, database operations involving at least one dataset 116, any of a variety processing functions by which existing datasets 116 may be analyzed to derive insights and/or by which new datasets 116 may be generated, any of a variety of process control operations, any of a variety of audio and/or visual processing operations, etc. Where the operations that are performed entail the use of datasets 116, an application routine 174 may persistently store datasets 116 with the at least one data device 110, and/or retrieve datasets 116 therefrom for use.

Each requesting device 180 of the at least one requesting device 180 may serve as a remote terminal from which an operator may remotely interact with at least one application routines 174 to access data within a dataset 116, and/or to make use of other service(s) provided thereby. Alternatively, or additionally, it may be that at least one requesting device 180 is employed by an operator of the processing device(s) 150 to perform various monitoring and/or maintenance tasks concerning the processing device(s) 150.

Figure 2A:
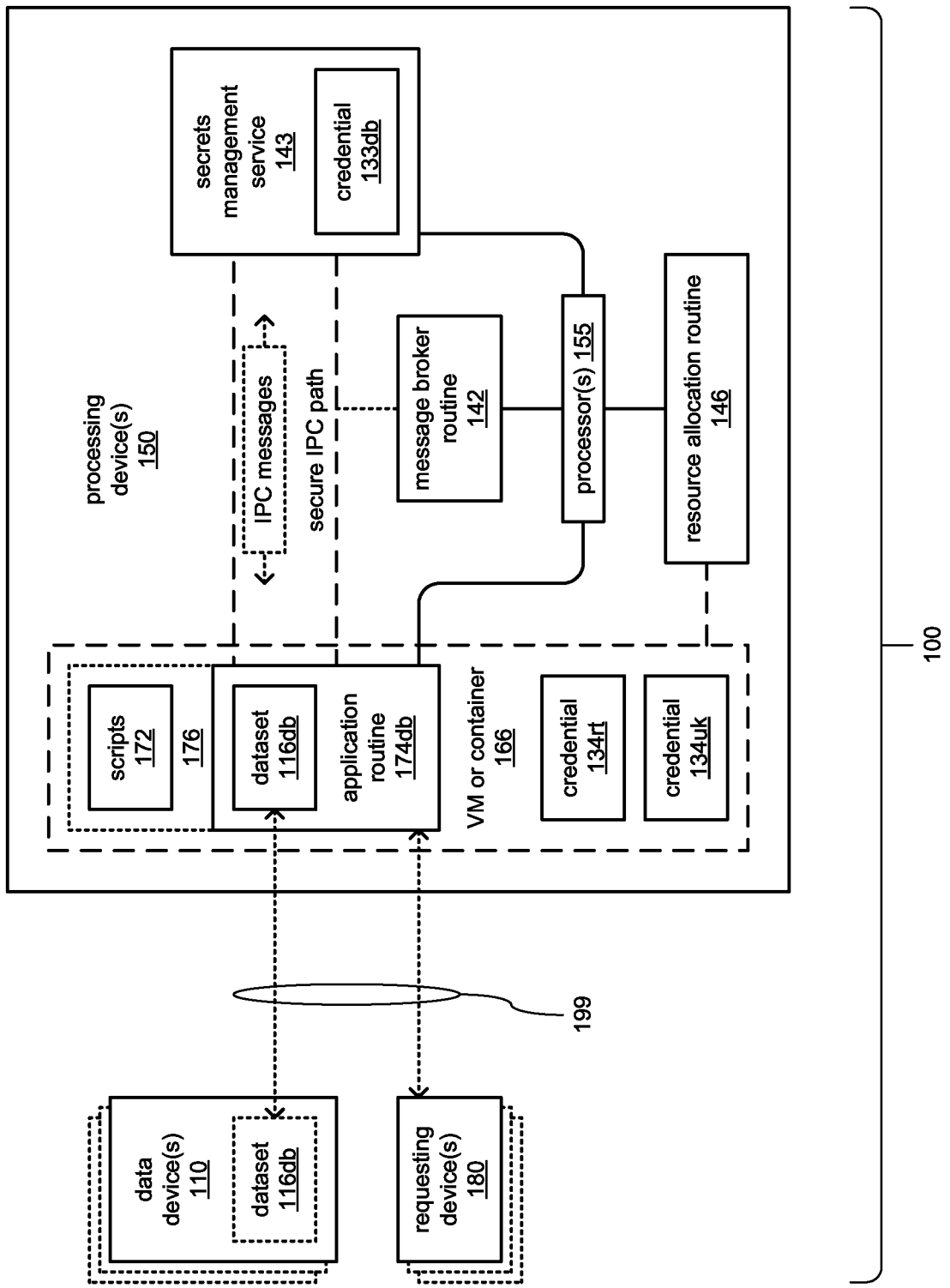
FIGS. 2A, 2B and 2C, taken together, illustrate aspects of regular automated credential rotation and use of credentials according to examples of the present disclosure.
Figure 2B:
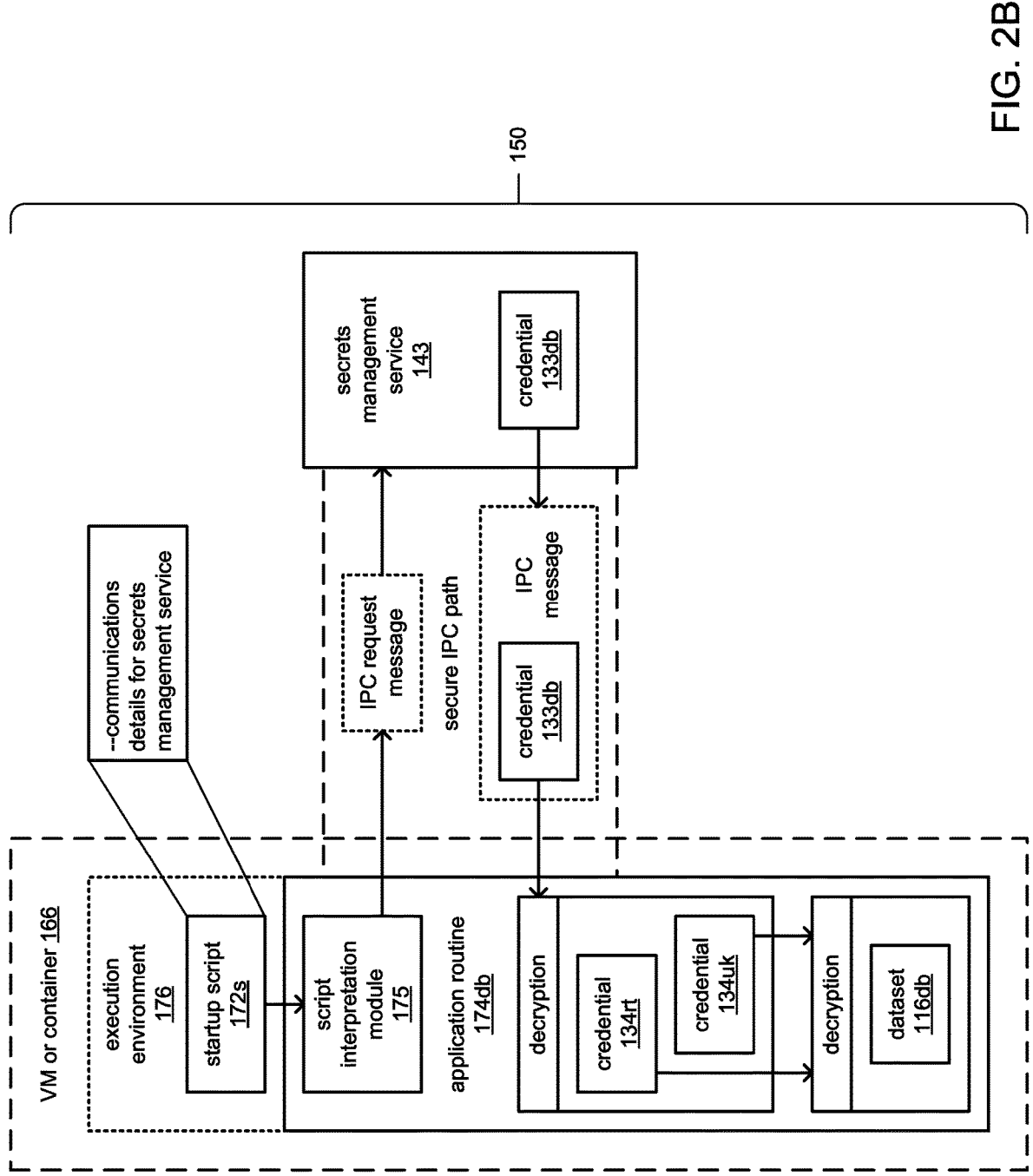
Figure 2C:
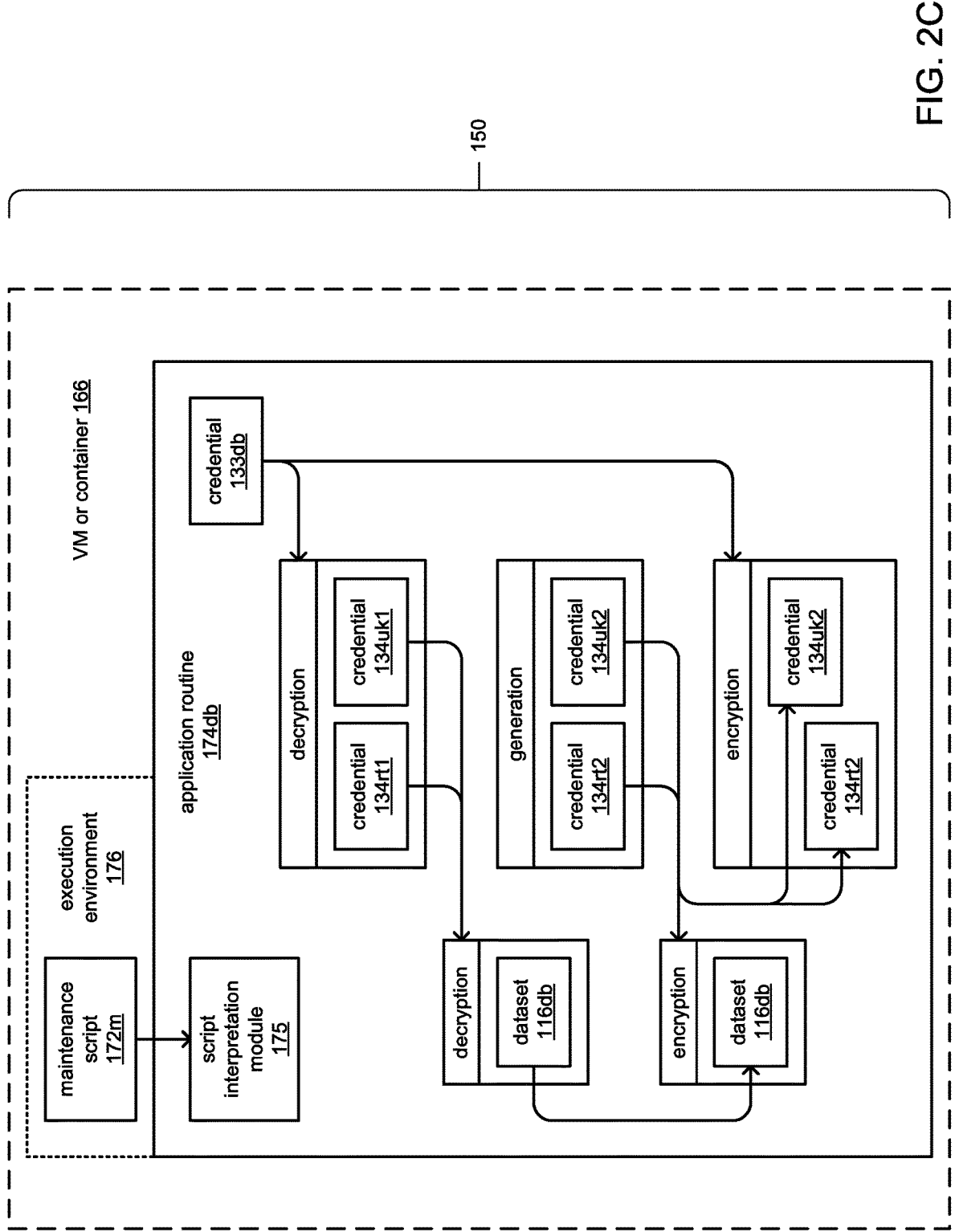

FIGS. 2A-C, taken together, depict aspects of cooperation between the secrets management service 143 and a database application routine 174*db* to maintain and/or use security credentials 133*db*, 134*rt* and 134*uk* to secure the database application routine 174*db* and/or access to a database dataset 116*db* according to examples of the present disclosure.

Turning to FIG. 2A, in support of executing at least one instance of the application routine 174*db*, processor(s) 155 of a processing device 150 may be caused by execution of the resource allocation routine 146 to instantiate a VM or container 166 in which the application routine 174*db* is to be executed. The processor(s) 155 may also be caused by execution of the message broker routine 142 to instantiate a secure IPC path that enables secure communications with the secrets management service 143.

As previously discussed, a portion of the processing resources provided by the processor(s) 155 may be allocated to the execution of the application routine 174*db* within the VM or container 166. More specifically, it may be that at least one processing core of the processor(s) 155 is allocated thereto. Again, in executing instructions of the application routine 174*db*, the processor(s) 155 may be caused to provide the additional execution environment 176 under the control of the application routine 174*db* for the execution of the instructions of various scripts 172 associated with the application routine 174*db*.

Such scripts 172 may be employed to aid and/or tailor the functionality of the application routine 174*db* within the environment provided within the VM or container 166, elsewhere within the processing device 150, and/or elsewhere within the system 100. By way of example, at least one of the scripts 172 may include information and/or executable instructions that enable access to the dataset 116*db* outside of the VM or container 166 and through the network 199 when stored within the at least one data device 110. Alternatively, or additionally, at least one of the scripts 172 may include information and/or executable instructions that enable the exchange of IPC messages via a secure IPC path with the secrets management service 143 outside of the VM or container 166.

As depicted, it may be that the credentials 134*rt* and 134*uk* are grouped together with the application routine 174*db* and various associated scripts 172 within the VM or container 166. It may be that, at the time the VM or container 166 is instantiated to provide an execution environment for the application routine 174*db*, a set of the credentials 134*rt* and 134*uk* may be replicated from an original set stored elsewhere and placed into the VM or container 166, along with the application routine 174*db* and its associated scripts 172. Regardless of the exact manner in which the credentials 134*rt* and 134*uk*, and the associated scripts 172 are provided within the VM or container 166, such placement therein may provide isolation and/or security from being accessed and/or corrupted by other routines being executed outside of the VM or container 166. In contrast, and as depicted, the credential 133*db* may be separately securely stored by the secrets management service 143.

FIG. 2B depicts aspects of an example of commencing execution of the application routine 174*db* in greater detail. In some implementations, the commencement of execution of the application routine 174*db* may be in response to the receipt of a request from a requesting device 180 via the network 199. In other implementations, the application routine 174*db* may normally be continuously operated in readiness to respond to database-related requests from requesting devices 180 with minimal delay. Thus, in such other implementations, the need to bring about the commencement of execution of the application routine 174*db* may arise relatively infrequently, such as after execution was caused to cease to enable maintenance, service and/or upgrades of portions of the system 100 to be performed.

Regardless of what circumstances bring about the commencement of execution of the application routine 174*db*, as previously discussed, doing so may entail the instantiation of the VM or container 166 in which the application routine 174*db* is executed, and/or the corresponding secure IPC path between the application routine 174*db* and the secrets management service 143.

Again, the instantiation of the VM or container 166 for an instance of the depicted example application routine 174*db* may entail the provision of the credentials 134*rt* and 134*uk* therein. In this example in which the application routine 174*db* is a database application, it may be that the credentials 134*rt* and 134*uk* serve as a combination of a "root token" and an "unseal key" that are used together to decrypt the dataset 116*db*. However, it should be noted that, in other implementations of the application routine 174*db*, such a pair of credentials 134*rt* and 134*uk* may serve other functions, and/or there may be more or fewer of the security credentials 134.

Also again, the instantiation of the VM or container 166 may entail the provision of various scripts 172 therein, including the depicted startup script 172*s*. As previously discussed, such scripts 172 may be executed within an execution environment 176 provided by the application routine 174*db* as a result of the execution of the application routine 174*db*. Thus, such an execution environment 176 for scripts 172 may be nested within the execution environment provided by the VM or container 166. As a result, scripts 172 that are executed within that environment may be provided with the same or similar security privileges as the application routine 174*db*, itself.

With the depicted secure IPC path instantiated, the application routine 174*db* and the secrets management service 143 may cooperate therethrough to transfer a copy of credential 133*db* to the application routine 174*db*. More specifically, and as depicted, the application routine 174*db* may include a script interpretation module 175, and execution of the application routine 174*db* may include execution of the script interpretation module 175. Through the execution of the script interpretation module 175, the startup script 172*s* may be executed within the execution environment 176, thereby causing the application routine 174*db* to request the credential 133*db* from the secrets management service 143 through the secure IPC path using any of a variety of types of IPC request message. In response, the secrets management service 143 may provide the credential 133*db* through the secure IPC path, and to the application routine 174*db*. As depicted, the credential 133*db* may, itself, be conveyed within any of a variety of types of IPC message.

It should be noted that any of a wide variety of protocols and/or application programming interfaces (APIs) may be used in initiating and/or performing such message-based communications. In some implementations, it may be that the request message 120*r* includes little more than an indication that execution of the application routine 174*db* has commenced. In other implementations, it may be that the request message 120*r* includes an explicit request for the credential 133*db* to be provided. Regardless of the exact protocol(s) and/or API(s) used, as previously discussed, the startup script 172*s* may include information and/or executable instructions that enable the application routine 174*db* to engage in such message-based communications.

In this example of securing access to a database application routine 174*db* and/or to a database dataset 116*db*, a form of envelope encryption may be employed in which the credential 133*db* is employed to decrypt the credentials 134*rt* and 134*uk*. In turn, the credentials 134*rt* and 134*uk* may be used as data credentials to directly decrypt the dataset 116*db*. It should be noted that the reliance of the application routine 174*db* on the secrets management service 143 to provide the credential 133*db* may necessitate at least some degree of coordination therebetween to ensure that the credential 133*db* provided to the application routine 174*db* is the correct security credential needed to decrypt the data credentials 134*rt* and 134*uk*. Otherwise, decryption of the dataset 116*db* may not be possible. Thus, if the security credential 133*db* is rotated at the secrets management service 143, a corresponding rotation would need to be performed at the application routine 174*db*.

FIG. 2C depicts aspects of an example of rotating the credentials 134*rt* and 134*uk*. More specifically, FIG. 2C depicts the replacement of current versions of these credentials 134*rt*1 and 134*uk*1 with new versions 134*rt*2 and 134*uk*2, respectively.

In some implementations, such rotations of the credentials 134*rt* and 134*uk* may be performed automatically at a regularly scheduled time and/or day (e.g., once a week at a particular time and day of the week when it has been observed that the volume of usage of the application routine 174*db* is relatively low). In other implementations, such rotations of these credentials may occur at a predetermined interval of time (e.g., in response to the passage of a pre-determined quantity of hours or days since the last rotation).

Regardless of the exact timing of such regular automated rotation of the credentials 134*rt* and 134*uk*, as depicted, it may be that at least a subset of such rotations is caused to occur coincident with the performance of other maintenance tasks (e.g., upgrades, archiving of the current version of the dataset 116*db*, etc.). Thus, it may be that a maintenance script 172*m* is executed within the execution environment 176 to control the performance of such maintenance tasks, including rotating the credentials 134*t*1 and 134*uk*.

Such an instance of such rotation may commence with the use of the credential 133*db* to decrypt the current versions of these credentials 134*rt*1 and 134*uk*1. The now decrypted current versions of these credentials 134*rt*1 and 134*uk*1 may then be used to decrypt the dataset 116*db* (if the dataset 116*db* has not already been decrypted). New versions of these credentials 134*rt*2 and 134*uk*2 may be generated to replace the current versions 134*rt*1 and 134*uk*1, respectively. These newly generated versions of these credentials 134*rt*2 and 134*uk*2 may then be used to re-encrypt the dataset 116*db*, and/or the credential 133*db* may be then be used to encrypt these new versions of these credentials 134*rt*2 and 134*uk*2 in preparation for being stored in encrypted form.

Though not specifically shown, it should be noted that a copy of the dataset 116*db*, in its unencrypted form or as encrypted by the current versions of these credentials 134*rt*1 and 134*uk*1 may be temporarily stored as a precaution against trouble occurring during the generation and/or use of the newer versions of these credentials 134*rt*2 and 134*uk*2, respectively. More specifically, it may be that the newer versions of these credentials 134*rt*2 and 134*uk*2 may be evaluated, and/or their use in encrypting the dataset 116*db* may be evaluated, to ensure they are able to be relied upon to perform such encryption before using them to do so.

It should also be noted that, while the application routine 174*db* is capable of directly rotating the credentials 134*rt* and 134*uk*, it may be that the application routine 174*db* is not capable of cooperating with the secrets management service 143 to cause the credential 133*db* to be rotated. In some implementations, it may be that the application routine 174*db* does not include the ability to communicate with the secrets management service 143 using the particular protocol and/or API that is required to be used to bring about the requisite cooperation therebetween to cause such rotation to occur.

Thus, example database application routine 174*db* of FIGS. 2A-C may not be capable of achieving compliance with requirements that all of the credentials associated with the application routine 174*db* be regularly automatically rotated.

FIGS. 3A-E, taken together, depict aspects of the use of a rotation script 172*r* to improve the cooperation between the secrets management service 143 and the database application routine 174*db* to maintain and use the security credentials 133*db*, 134*rt* and 134*uk* of FIGS. 2A-C according to examples of the present disclosure.

Figure 3A:
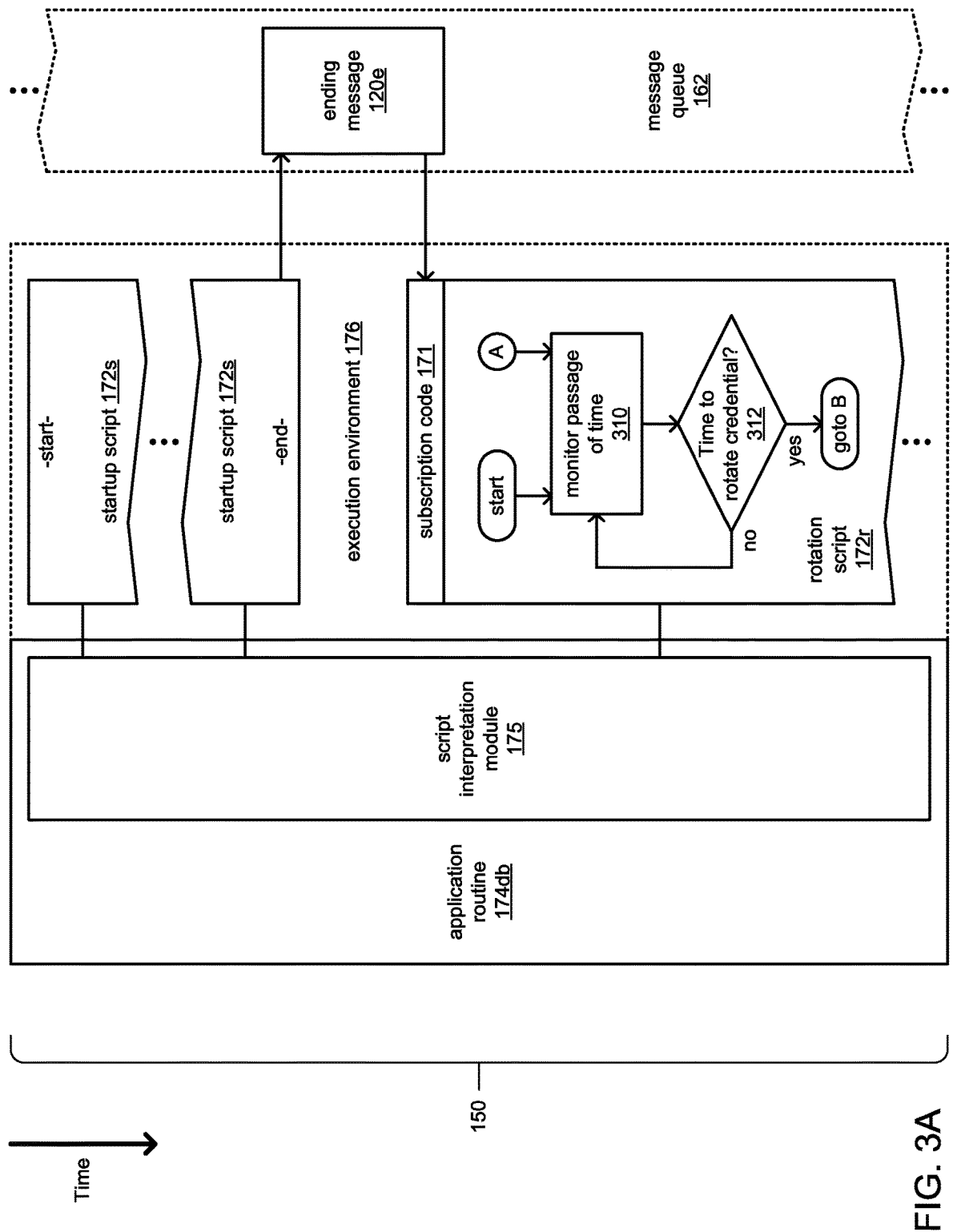
FIGS. 3A, 3B, 3C, 3D and 3E, taken together, illustrate aspects of improving regular automated credential rotation and use of credentials according to examples of the present disclosure.

Turning to FIG. 3A, as previously discussed, it may be that at least a subset of the rotations of the credentials 134*rt* and 134*uk* of the database application routine 174*db* may be performed coincident with ceasing execution of the application routine 174*db* to allow for maintenance, servicing and/or upgrades of portions of the system 100. As also previously discussed, it may be that commencement of the execution of a script 172 may be made arranged to be triggered by a particular message 120 being output onto a particular message queue 162. Thus, and as depicted, it may be that the rotation script 172*r* has been created to include the depicted subscription code 171 to monitor the depicted message queue 162 for the output of the depicted ending message 120*e* thereon. The ending message 120*e* output onto the depicted queue 162 may indicate that the execution of the startup script 172*s* has been completed, and the subscription code 171 may employ such output of the ending message 120*e* onto the depicted queue 162 as a trigger to cause the commencement of execution of the rotation script 172*r*.

As previously discussed, execution of an application routine 174, such as the database application routine 174*db*, may include execution of a script interpretation module 175. Thus, and as depicted, the execution of the database application routine 174*db* may result in the execution of its corresponding script interpretation module 175, thereby causing the execution of the starting script 172*s* within the depicted execution environment 176, followed by the execution of the rotation script 172*r* therein.

Upon triggering of the execution of the rotation script 172*r*, processor(s) 155 of the processing device 150 within which the rotation script 172*r* is executed may be caused, at 310, to monitor the passage of time. In some implementations (and as indicated in the depicted loop between 310 and 312), this may entail repeatedly accessing a clock component (not specifically shown) of the processing device 150 to determine when either a predetermined time and date has arrived, and/or to determine when a predetermined amount of time has passed since the last time execution of the application routine 174*db* commenced and/or since the last time a rotation of the credential 133*db* occurred. It should be noted that, as an alternative to, or in addition to, monitoring the passage of time, the processor(s) 155 may be caused to repeatedly check the current level of utilization of the application routine 174*db* to identify a time during which such utilization is at a relatively low level.

Figure 3B:
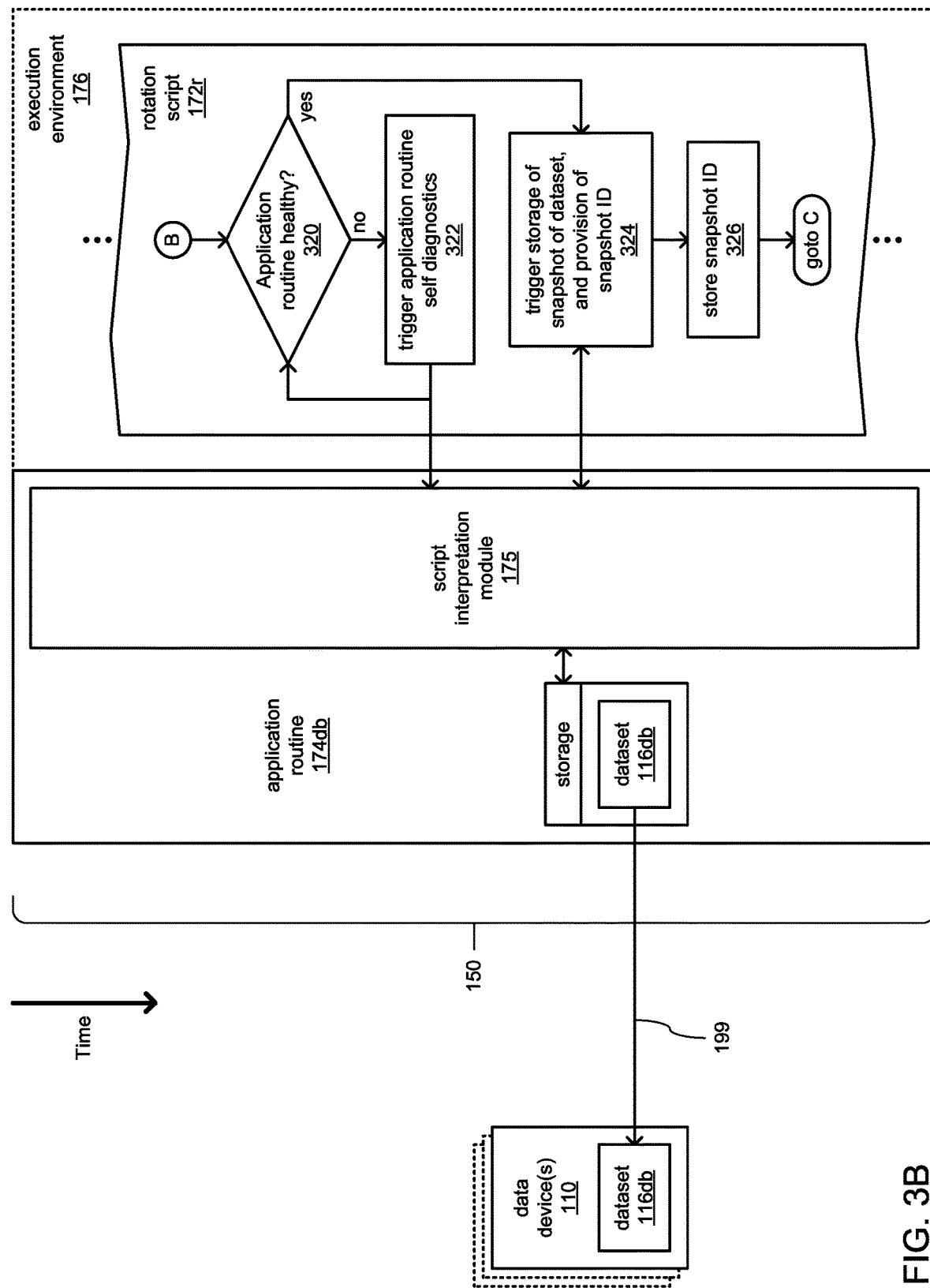

Turning to FIG. 3B, upon arriving at a time to rotate the credential 133*db*, the processor(s) 155 may be caused to perform various checks of the condition of the application routine 174*db*, and/or various one(s) of the credentials 133*db*, 134*rt* and/or 134*uk* to ensure that there are currently no malfunctions or other conditions that may impair and/or interrupt the rotation of the credential 133*db*. Thus, at 320, continued execution of the rotation script 172*r* within the execution environment 176 may cause the processor(s) 155 to check on the current functional condition of the application routine 174*db*. If, at 320, a malfunction or other abnormal condition with the application routine 174*db* is identified, then the processor(s) 155 may be caused to provide an input (e.g., a command to an API supported by the script interpretation module 175) that triggers the performance of self diagnostic operation(s) within the application routine 174db.

Alternatively, or additionally, and although not specifically shown, it may be that the identification of such a malfunction or other abnormal condition may trigger the output of a message 120 that is indicative of the situation onto a message queue 162 (e.g., the message queue 162 depicted in FIG. 3A). Such a message 120 may then serve as a trigger to commence the execution of another script 172 that may perform at least one diagnostics function and/or at least one repair operation of the application routine 174db.

However, if no such malfunction or other abnormal condition is identified as occurring at 320, then the processor(s) 155 may be caused by continued execution of the rotation script 172r to provide the script interpretation module 175 with a command or other input that triggers the storage of a snapshot of the database dataset 116db in its current condition at 324. It should be noted that, as part of storing such a snapshot, the application routine 174db may be placed into a non-operating mode in which queries of, and/or updates to, the dataset 116db are temporarily halted so that the state of the dataset 116db is caused to become static throughout the time operations are performed to rotate the credential 133db. In some implementations, putting the dataset 116db into a static condition and storing a snapshot thereof may entail invoking another script (not specifically shown) specifically created for performing such an archival function.

As part of the storage of such a snapshot of the dataset 116db at 324, a snapshot identifier may be generated that provides a mechanism by which this particular snapshot may be referred for purposes of being subsequently retrieved (e.g., retrieved from the at least one data device 110). At 326, such a snapshot ID may be locally stored to be readily usable to retrieve the snapshot in event that these operations to rotate the credential 133db is unable to be completed due to a malfunction or other form of interruption.

Figure 3C:
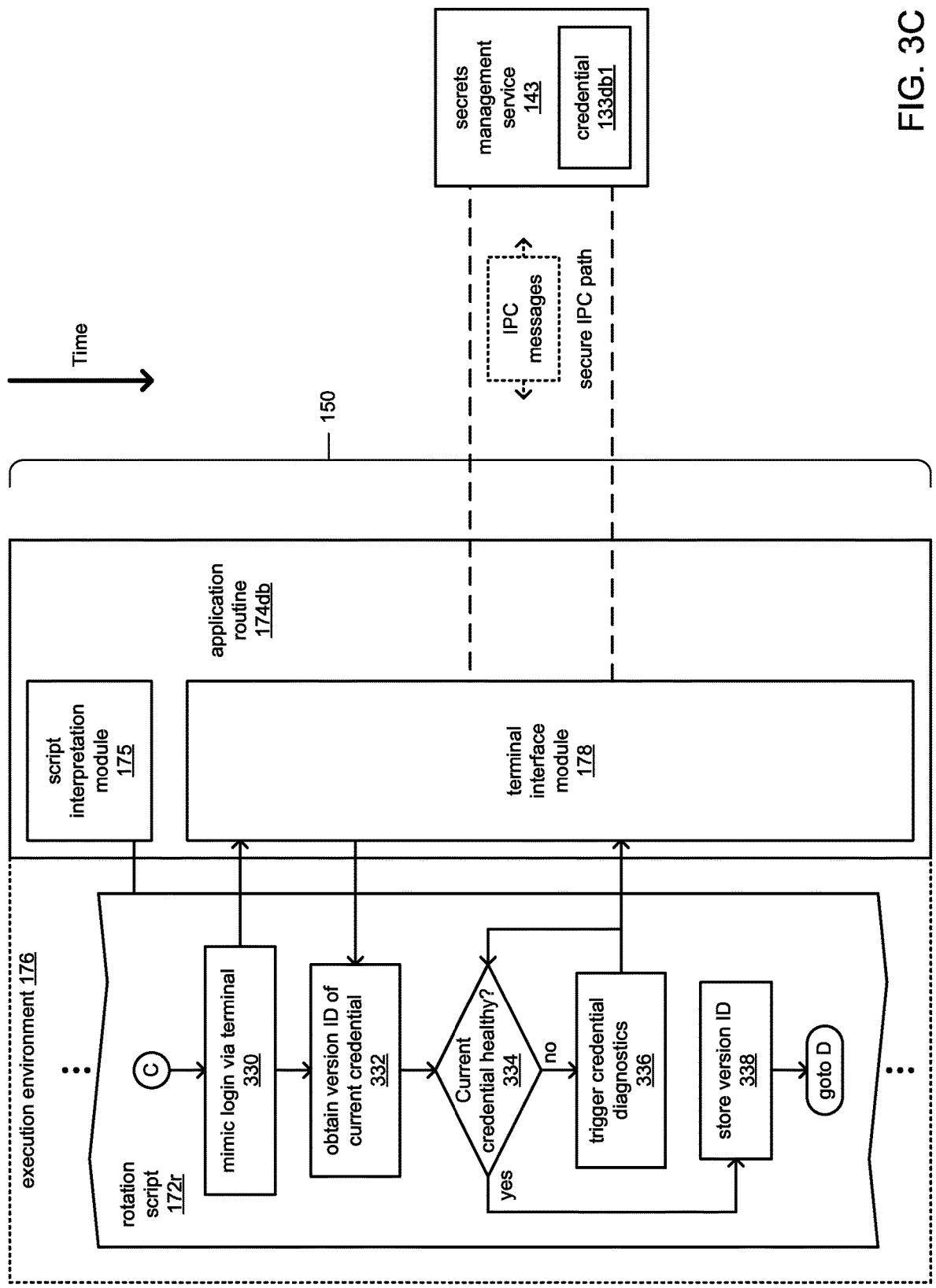

Turning to FIG. 3C, it may be that the protocol(s) and/or the API by which scripts are able to interact with the script interpretation module 175 do not include the ability to communicate with the secrets management service 143, either at all, or about rotating a credential stored by the secrets management service 143. However, as depicted, the application routine 174db may include a terminal interface module 178 by which an operator of a remote device (e.g., a requesting device 180) may be able to log into the application routine 174db via the network 199. Also, it may be that such a remote interaction provides access to protocol(s), an API and/or a user interface (UI) that provides the ability for that operator to interact with the secrets management service 143 through the application routine 174db in a manner that includes the ability to manually effect the rotation of a credential stored by the secrets management service 143.

Thus, at 330, continued execution of the rotation script 172r may cause processor(s) 155 to interact with the terminal interface module 178 in a manner that mimics usage, by an operator, of a terminal coupled to the processing device 150 via the network 199 to log into the application routine 174db. At 332, upon completion of such logging into the terminal interface module 178 of the application routine 174db, continued execution of the rotation script 172r may cause processor(s) 155 of the processing device 150 to commence interacting with the secrets management service 143 through the terminal interface module 178, which in turn, may cause interaction with the secrets management service 143 through the secure IPC path between at least the terminal interface module 178 of the application routine 174db and the secrets management service 143.

At 332, as part of such interactions with the secrets management service 143, an identifier of the current version of the credential 133db (i.e., the depicted credential 133db1 in FIG. 3C) may be obtained. As with the snapshot ID earlier retrieved at 324, such retrieval of the version ID for the current version of the credential 133db1 may be in preparation for having to forego efforts at credential rotation, and reverting to using the current version as a result of a malfunction or other form of interruption of the credential rotation.

At 334, a check may be made of whether the current version of the credential 133db1 is in a healthy state (e.g., not corrupted, or otherwise rendered unavailable due to a malfunction, etc.). If, at 334, the current version of the credential 133db1 is not in a healthy state, then at 336, various diagnostic and/or repair operations may be triggered in a manner not unlike what was earlier discussed for diagnostics and/or repair operations triggered at 322. However, if the current version of the credential 133db1 is found to be in a healthy state at 334, then the retrieved version ID for the current version of the credential 133db1 may be stored at 338.

Figure 3D:
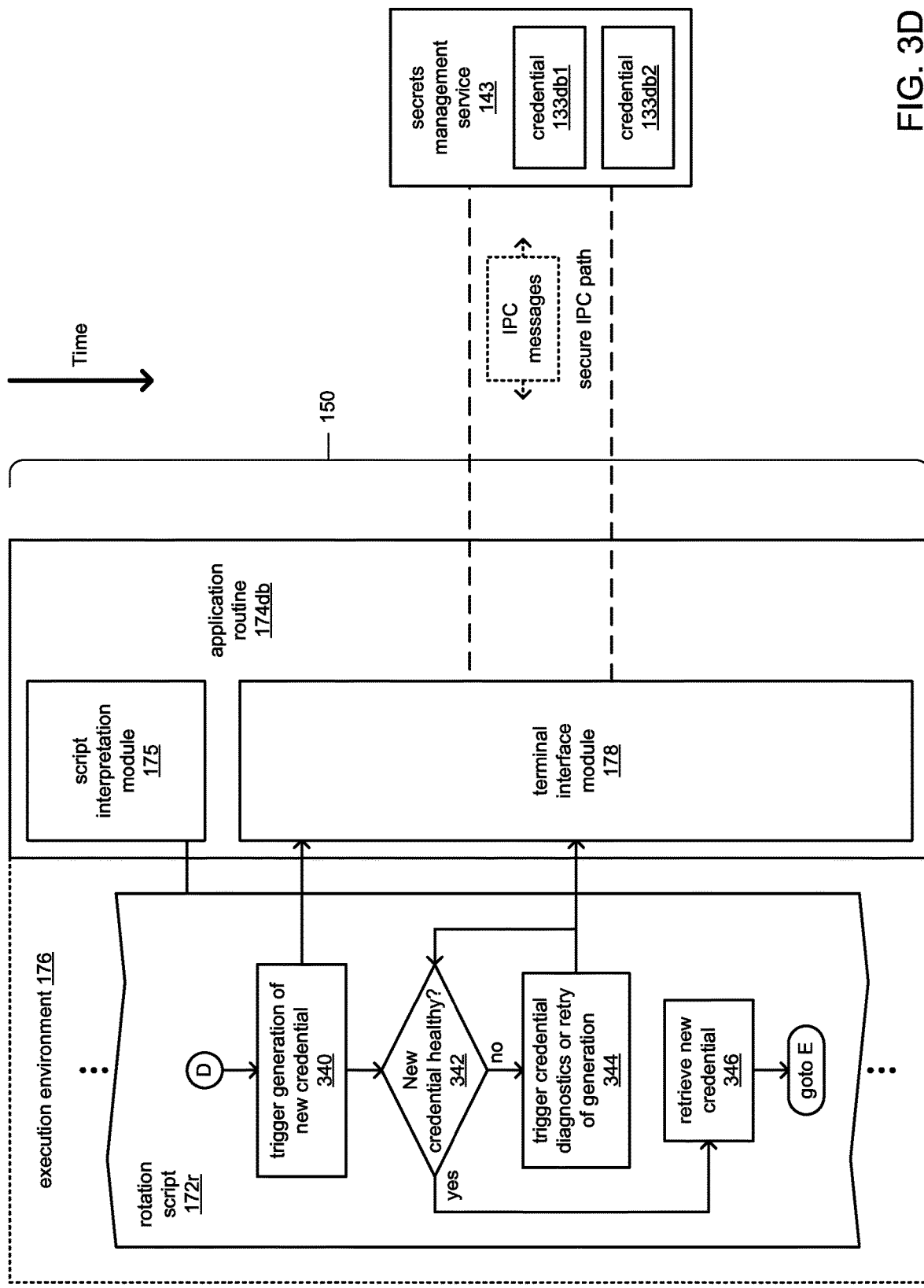

Turning to FIG. 3D, continued execution of the rotation script 172r may cause processor(s) 155 to continue such mimicry interaction with the secrets management service 143 through the terminal interface module 178. Specifically, at 340, input to the terminal interface module 178 may be provided that causes the conveying of a message 120 to the secrets management service 143 that, in turn, causes the generation of a new version of the credential 133db (i.e., the depicted credential 133db2 in FIG. 3D).

At 342, a check may be made of whether the new version of the credential 133db2 is in a healthy state. It may be that a healthy state for the new credential 133db2 includes having been generated to meet various minimum requirements for a security credential (e.g., incorporating a mix of text characters that includes different forms of capitalization, a mix of different character types, etc.), in addition to or in lieu of, not being corrupted or otherwise rendered unavailable due to a malfunction, etc. If, at 342, the new version of the credential 133db2 is not in a healthy state, then at 344, various diagnostic, repair and/or credential generation operations may be triggered in a manner not unlike what was earlier discussed for diagnostics and/or repair operations triggered at 322. However, if the new version of the credential 133db2 is found to be in a healthy state at 342, then at 346, the secrets management service 143 may be requested to provide the new version of the credential 133db2 through the terminal interface module 178, and via the secure IPC path. And, in response, the secrets management service 143 may provide the new version of the credential 133db2 therethrough.

In some implementations, the sending of a request to the secrets management service 143 to either generate the new version of the credential 133db2 or to provide the new version of the credential 133db2 may implicitly cause the new version of the credential 133db2 to functionally replace what was the current version of the credential 133db1. In this way, credential rotation may be caused to be completed within the secrets management service 143 such that the new version of the credential 133db2 is the version that is provided to the application routine 174db on the next occasion of the execution of the application routine 174db being caused to commence. However, it may be that the secrets management service 143 is able to be requested to revert back to what was the current version of the credential 133*db*1. This may be done in response to an inability to perform a corresponding credential rotation within the application routine 174*db* such that the new version 133*db*2 is used therein in place of what was the current version 133*db*1. Doing so may entail further use of the mimicry of an operator of a terminal to present such a request to the secrets management service 143.

Figure 3E:
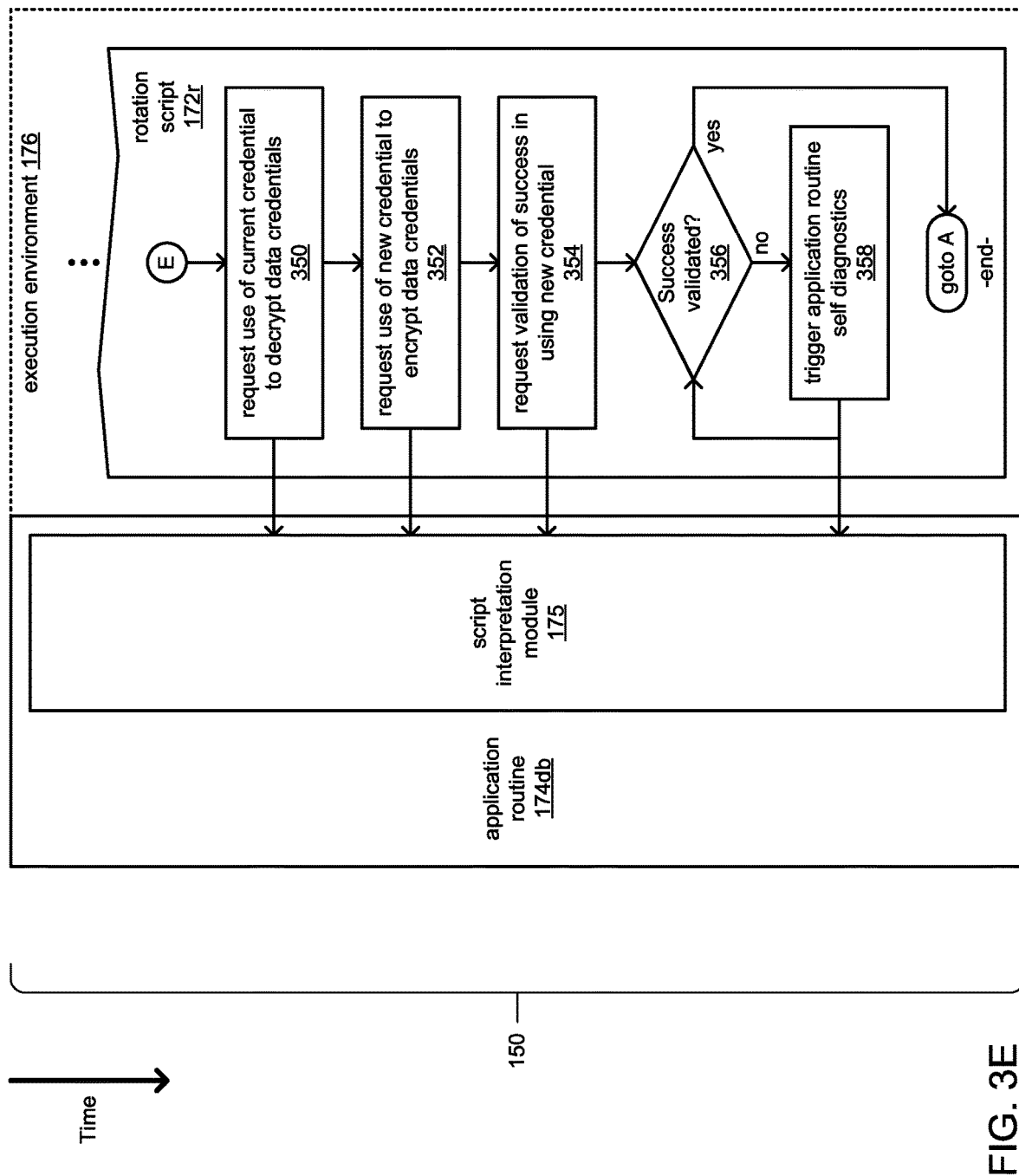

Turning to FIG. 3E, continued execution of the rotation script 172*r* may cause processor(s) 155 to cease employing such mimicry interaction with the secrets management service 143, and return to more direct interaction with the application routine 174*db* through the script interpretation module 175 to cause a credential rotation within the application routine 174*db* that corresponds to the credential rotation just performed within the secrets management service 143. In this way, the application routine 174*db* is prepared to make use of the new version of the credential 133*db*2 upon receiving it from the secrets management service 143 on the next occasion of the execution of the application routine 174*db* being caused to commence.

More specifically, at 350, the processor(s) 155 may be caused to request that what was the current version of the credential 133*db*1 (and which still is the current version within the application routine 174*db*) to be used to decrypt the data credentials 134*rt* and 134*uk*. At 352, a request may then be made to re-encrypt the data credentials 134*rt* and 13*ruk* using the new version of the credential 133*db*2.

At 354, a request may be made to perform a validation of success in being able to use the new version of the credential 133*db*2. In some implementations, such a validation may entail performing a test decryption of the data credentials 134*rt* and 134*uk* to confirm that the new version of the credential 133*db*2 is able to be successfully used for such decryption. If, at 356, the new version of the credential 133*db*2 cannot be so validated, then at 358, various diagnostic and/or repair operations may be triggered in a manner not unlike what was earlier discussed for diagnostics and/or repair operations triggered at 322. However, if the new version of the credential 133*db*2 is able to be validated for use in performing such decryption of the data credentials 134*rt* and 134*uk* at 356, then the credential rotation at both the secrets management service 143 and at the application routine 174*db* may be deemed successful. Further execution of the rotation script 172*r* may then continue with looping back to the start of the rotation script 172*r* where, again, the passage of time is monitored at 310 to await the approach of the next time for rotating the credential 133*db*.

The storage 156 of the processing device 150 may include any of a variety of types of non-transitory computer readable storage medium implemented using any of a variety of storage technologies, including and not limited to, any electronic, magnetic, optical, or other physical storage device that stores executable instructions. For example, the storage 150 may include random access memory (RAM), an electrically-erasable programmable read-only memory (EEPROM), a storage drive, an optical disc, or the like. The storage 150 may be encoded to store executable instructions (e.g., instructions of the model maintenance routine 140) that cause a processor (e.g., the processor(s) 155) to perform operations according to examples of the disclosure.

The processor(s) 155 of the processing device 150 may include memory to either permanently or temporarily store a set of instructions (e.g., instructions of the model maintenance routine 140). The processor(s) 155 execute the instructions that are stored in the memory or memories in order to process data. The set of instructions may include various instructions that perform a particular task or tasks, such as those tasks described above. Such a set of instructions for performing a particular task may be characterized as a software program.

The present disclosure may employ a software stack to enlist the underlying tools, frameworks, and libraries used to build and run example applications of the present disclosure. Such a software stack may include PHP, React, Cassandra, Hadoop, Swift, etc. The software stack may include both frontend and backend technologies including programming languages, web frameworks servers, and operating systems. The frontend may include JavaScript, HTML, CSS, and UI frameworks and libraries. In one example, a MEAN (MongoDB, Express.js, Angular JS, and Node.js) stack may be employed. In another example, a LAMP (Linux, Apache, MySQL, and PHP) stack may be utilized.

Any suitable programming language can be used to implement the routines of particular examples including Java, Python, JavaScript, C, C++, assembly language, etc. Different programming techniques can be employed such as procedural or object oriented. The routines may execute on specialized processors.

As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise. While the above is a complete description of specific examples of the disclosure, additional examples are also possible. Thus, the above description should not be taken as limiting the scope of the disclosure which is defined by the appended claims along with their full scope of equivalents.

The invention claimed is:

1. A system comprising:
at least one processor of a processing device; and
a storage to store instructions of a first executable routine that, when executed by the at least one processor, cause the at least one processor to perform operations comprising:
  instantiate a first execution environment in which to execute instructions of a second executable routine; and
  execute the instructions of the second executable routine within the first execution environment to cause the at least one processor to perform operations comprising:
    monitor a passage of time to identify an arrival of a time to coordinate a rotation of a security credential between the first executable routine and a secrets management service; and
    in response to identifying the arrival of the time, perform operations comprising:
      provide a first request to the first executable routine to communicate with the secrets management service of the processing device to request rotation of the security credential at the secrets management service; and
      provide a second request to the first executable routine to rotate the security credential at the first executable routine.

2. The system of claim 1, wherein:
the first executable routine comprises an application routine to perform processing operations with an encrypted dataset;

the at least one processor is caused, by execution of instructions of the secrets management service, to, in response to commencement of execution of the instructions of the first executable routine, provide the security credential to the first executable routine to enable decryption of the encrypted dataset; and the at least one processor is caused, by execution of the instructions of the first executable routine to, in response to receipt of the security credential from the secrets management service, use the security credential to decrypt the encrypted dataset.

3. The system of claim 2, wherein:
the encrypted dataset is encrypted using envelope encryption in which at least one data credential is employed to directly encrypt the encrypted data set, and the security credential is employed to directly encrypt the at least one data credential; and
using the security credential to decrypt the encrypted dataset comprises performing operations comprising:
use the security credential to decrypt the at least one data credential; and
use the at least one data credential to decrypt the encrypted data.

4. The system of claim 1, wherein:
the instructions of the first executable routine are executed within a second execution environment within a virtual machine (VM) or container provided by a resource allocation routine of the processing device;
the first execution environment is nested within the second execution environment; and
the first executable routine is coupled to the secrets management service through a message queue through which the security credential is provided by the secrets management service to the first executable routine, and through which the first executable routine relays the first request to the secrets management service to rotate the security credential.

5. The system of claim 4, wherein:
the first executable routine and the secrets management service cooperate through the message queue to allow an operator of another device external to the processing device to interact with the secrets management service through the first executable routine; and
providing the first request to the first executable routine to communicate with the secrets management service to request rotation of the security credential at the secrets management service comprises causing the at least one processor to perform operations comprising:
mimic communications from an operator of another device using the other device to log into the first executable routine; and
mimic communications from the operator of the other device providing the first request to the first executable routine through the other device.

6. The system of claim 4, wherein the at least one processor is caused to perform operations comprising:
instantiate multiple VMs or containers to provide multiple execution environments to support executions of multiple executable routines across the multiple VMs or containers at least partially in parallel, wherein:
the multiple VMs or containers comprises the VM or container in which the first executable routine is executed; and
the multiple executable routines comprises the first executable routine; and
instantiate multiple message queues to couple the multiple VMs or containers to the secrets management service to enable provision of each of multiple security credentials to an associated one of the multiple executable routines, wherein:
the multiple message queues comprises the message queue; and
the multiple security credentials comprises the security credential.

7. The system of claim 1, wherein:
in response to the request to rotate the security credential at the secrets management service, a new version of the security credential is generated at the secrets management service to replace a current version of the security credential; and
the at least one processor is caused by execution of the instructions of the second executable routine to perform operations comprising:
prior to providing the first request to the first executable routine, provide a third request to the first executable routine to communicate with the secrets management service to request a check of a health status of the current version of the security credential; and
store an identifier of the current version of the security credential prior to the rotation of the security credential at the secrets management service to enable reversion to the current version of the security credential in response to a failure of the rotation of the security credential at the secrets management service or at the first executable routine.

8. The system of claim 7, wherein:
in response to the second request to rotate the security credential at the first executable routine, the current version of the security credential is used to decrypt a dataset, and the new version of the security credential is used to re-encrypt the dataset; and
the at least one processor is caused by execution of the instructions of the second executable routine to perform operations comprising:
prior to providing the second request to the first executable routine, provide a fourth request to the first executable routine to check a health status of at least one of the dataset and the first executable routine; and
store a copy of the dataset prior to the rotation of the security credential at the first executable routine to enable reversion to use of the current version of the security credential to encrypt the dataset in response to failure of the rotation of the security credential at the secrets management service or at the first executable routine.

9. A non-transitory machine-readable storage medium including instructions of a script stored thereon which, when executed by at least one processor of a processing device, cause the at least one processor to perform operations comprising:
monitor a passage of time to identify an arrival of a time to coordinate a rotation of a security credential between an executable routine and a secrets management service of the processing device; and
in response to identifying the arrival of the time, perform operations comprising:
provide, from within a first execution environment provided by the executable routine, a first request to the executable routine to communicate with the secrets management service of the processing device to request rotation of the security credential at the secrets management service; and provide a second request to the executable routine to rotate the security credential at the executable routine.

10. The non-transitory machine-readable storage medium of claim 9, wherein:
the executable routine comprises an application routine to perform processing operations with an encrypted dataset;
the at least one processor is caused, by execution of instructions of the secrets management service, to, in response to commencement of execution of the instructions of the executable routine, provide the security credential to the executable routine to enable decryption of the encrypted dataset; and
the at least one processor is caused, by execution of the instructions of the executable routine to, in response to receipt of the security credential from the secrets management service, use the security credential to decrypt the encrypted dataset.

11. The non-transitory machine-readable storage medium of claim 10, wherein:
the encrypted dataset is encrypted using envelope encryption in which at least one data credential is employed to directly encrypt the encrypted data set, and the security credential is employed to directly encrypt the at least one data credential; and
using the security credential to decrypt the encrypted dataset comprises performing operations comprising:
use the security credential to decrypt the at least one data credential; and
use the at least one data credential to decrypt the encrypted data.

12. The non-transitory machine-readable storage medium of claim 9, wherein:
the instructions of the executable routine are executed within a second execution environment within a virtual machine (VM) or container provided by a resource allocation routine of the processing device;
the first execution environment is nested within the second execution environment; and
the executable routine is coupled to the secrets management service through a message queue through which the security credential is provided by the secrets management service to the executable routine, and through which the executable routine relays the first request to the secrets management service to rotate the security credential.

13. The non-transitory machine-readable storage medium of claim 12, wherein:
the executable routine and the secrets management service cooperate through the message queue to allow an operator of another device external to the processing device to interact with the secrets management service through the executable routine; and
providing the first request to the executable routine to communicate with the secrets management service to request rotation of the security credential at the secrets management service comprises causing the at least one processor to perform operations comprising:
mimic communications from an operator of another device using the other device to log into the executable routine; and
mimic communications from the operator of the other device providing the first request to the executable routine through the other device.

14. The non-transitory machine-readable storage medium of claim 12, wherein the at least one processor is caused to perform operations comprising:
instantiate multiple VMs or containers to provide multiple execution environments to support executions of multiple executable routines across the multiple VMs or containers at least partially in parallel, wherein:
the multiple VMs or containers comprises the VM or container in which the executable routine is executed; and
the multiple executable routines comprises the executable routine; and
instantiate multiple message queues to couple the multiple VMs or containers to the secrets management service to enable provision of each of multiple security credentials to an associated one of the multiple executable routines, wherein:
the multiple message queues comprises the message queue; and
the multiple security credentials comprises the security credential.

15. The non-transitory machine-readable storage medium of claim 9, wherein:
in response to the request to rotate the security credential at the secrets management service, a new version of the security credential is generated at the secrets management service to replace a current version of the security credential; and
the at least one processor is caused by execution of the instructions of the script to perform operations comprising:
prior to providing the first request to the executable routine, provide a third request to the executable routine to communicate with the secrets management service to request a check of a health status of the current version of the security credential; and
store an identifier of the current version of the security credential prior to the rotation of the security credential at the secrets management service to enable reversion to the current version of the security credential in response to a failure of the rotation of the security credential at the secrets management service or at the executable routine.

16. The non-transitory machine-readable storage medium of claim 15, wherein:
in response to the second request to rotate the security credential at the executable routine, the current version of the security credential is used to decrypt a dataset, and the new version of the security credential is used to re-encrypt the dataset; and
the at least one processor is caused by execution of the instructions of the script to perform operations comprising:
prior to providing the second request to the executable routine, provide a fourth request to the executable routine to check a health status of at least one of the dataset and the executable routine; and
store a copy of the dataset prior to the rotation of the security credential at the executable routine to enable reversion to use of the current version of the security credential to encrypt the dataset in response to failure of the rotation of the security credential at the secrets management service or at the executable routine.

17. A computer-implemented method for rotating security credentials comprising:
instantiating a first execution environment in which to execute instructions of a script; and executing, by at least one processor of a processing device, the instructions of the script within the first execution environment to cause the at least one processor to perform operations comprising:
  monitoring a passage of time to identify an arrival of a time to coordinate a rotation of a security credential between an executable routine and a secrets management service; and
  in response to identifying the arrival of the time, performing operations comprising:
    providing a first request to the executable routine to communicate with the secrets management service of the processing device to request rotation of the security credential at the secrets management service; and
    providing a second request to the executable routine to rotate the security credential at the executable routine.

18. The computer-implemented method of claim 17, wherein:
  the executable routine comprises an application routine to perform processing operations with an encrypted dataset;
  the at least one processor is caused, by execution of instructions of the secrets management service, to, in response to commencement of execution of the instructions of the executable routine, provide the security credential to the executable routine to enable decryption of the encrypted dataset; and
  the at least one processor is caused, by execution of the instructions of the executable routine to, in response to receipt of the security credential from the secrets management service, use the security credential to decrypt the encrypted dataset.

19. The computer-implemented method of claim 17, wherein:
  the instructions of the executable routine are executed within a second execution environment within a virtual machine (VM) or container provided by a resource allocation routine of the processing device;
  the first execution environment is nested within the second execution environment; and
  the executable routine is coupled to the secrets management service through a message queue through which the security credential is provided by the secrets management service to the executable routine, and through which the executable routine relays the first request to the secrets management service to rotate the security credential.

20. The computer-implemented method of claim 19, wherein:
  the executable routine and the secrets management service cooperate through the message queue to allow an operator of another device external to the processing device to interact with the secrets management service through the executable routine; and
  providing the first request to the executable routine to communicate with the secrets management service to request rotation of the security credential at the secrets management service comprises:
    mimicking communications from an operator of another device using the other device to log into the executable routine; and
    mimicking communications from the operator of the other device providing the first request to the executable routine through the other device.

* * * * *